United States Patent [19]

Spohr

[11] 4,418,461

[45] Dec. 6, 1983

[54] PROCESS FOR PRODUCING SLATS FOR A VERTICAL SLATTED VENETIAN BLIND

[75] Inventor: Horst Spohr, Cuxhaven, Fed. Rep. of Germany

[73] Assignee: Bautex Adolf Stover KG, Langen-Sievern, Fed. Rep. of Germany

[21] Appl. No.: 326,817

[22] Filed: Dec. 2, 1981

[30] Foreign Application Priority Data

Apr. 17, 1981 [DE] Fed. Rep. of Germany ....... 3115832

[51] Int. Cl.[3] ........................ B23Q 17/00; A41H 1/00

[52] U.S. Cl. ........................................ 29/407; 33/2 H; 33/174 G

[58] Field of Search ................... 29/407, 417; 33/2 H, 33/174 G; 83/442

[56] References Cited

U.S. PATENT DOCUMENTS 2,814,116 11/1957 Goodman ............................ 33/2 H
4,010,592 3/1977 Nixon .............................. 33/174 G
4,221,054 9/1980 Schaevitz ........................ 33/174 G
4,228,592 10/1980 Bodger ........................... 33/174 G

*Primary Examiner*—Howard N. Goldberg
*Assistant Examiner*—Steven Nichols
*Attorney, Agent, or Firm*—Merriam, Marshall & Bicknell

[57] ABSTRACT

The invention relates to a process for producing ready-to-use slats from semifinished slat portions for a slatted Venetian blind having vertically directed slats. In connection with the process, the slat portions are in each case cut at their free lower end to the length corresponding to the installation height, plus an extra length that takes into account a wrap-over portion. The wrap-over portion of a slat is in each case folded over at a bending edge predetermined by the use length. The lower end part of a slat is provided, in the vicinity of the wrap-over portion, with a system of perforations consisting of at least two holes for receiving retaining pins of a retaining means. The retaining pins are passed through the holes and locked.

5 Claims, 12 Drawing Figures

Figure 1:
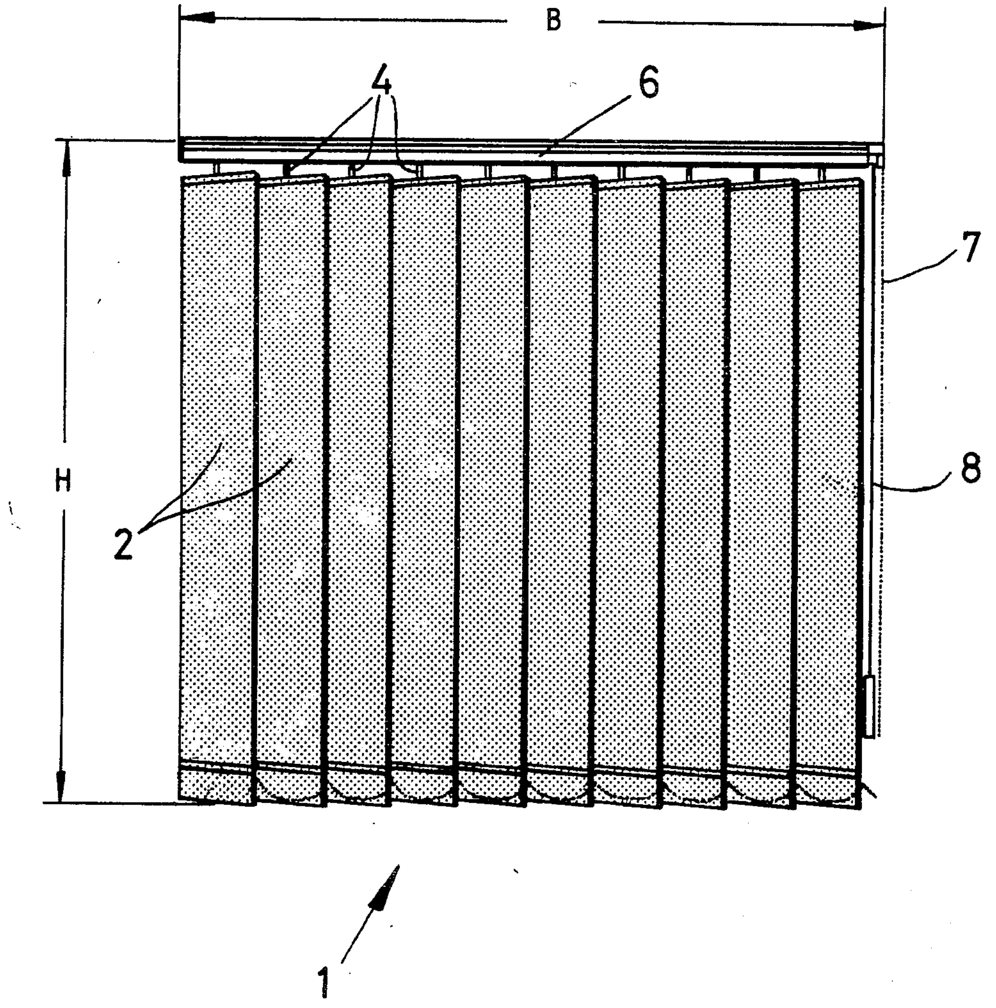

3
9
11
31
39
23
33
32
34
13
12
29
22
28
36

Fig. 7
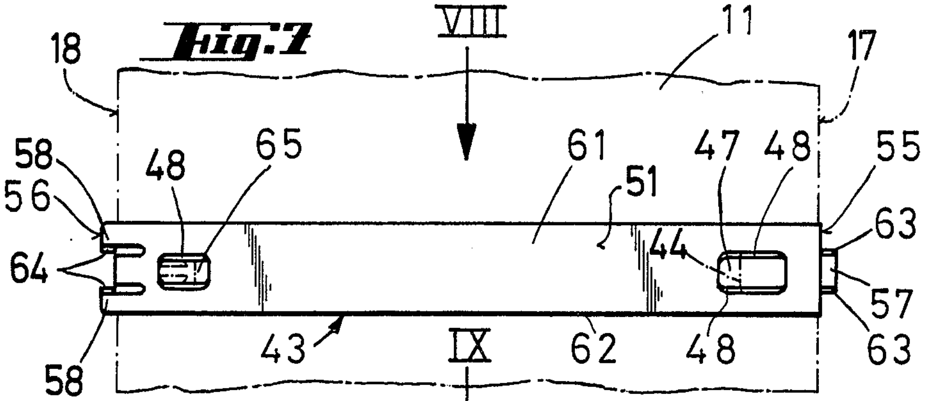
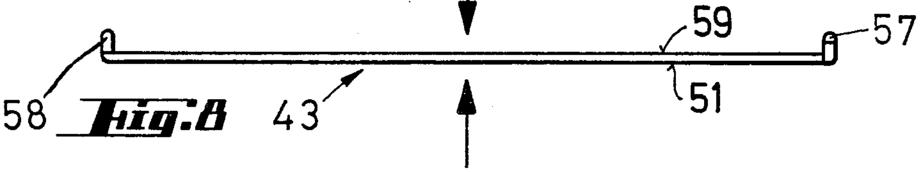
Fig. 8
Fig. 9
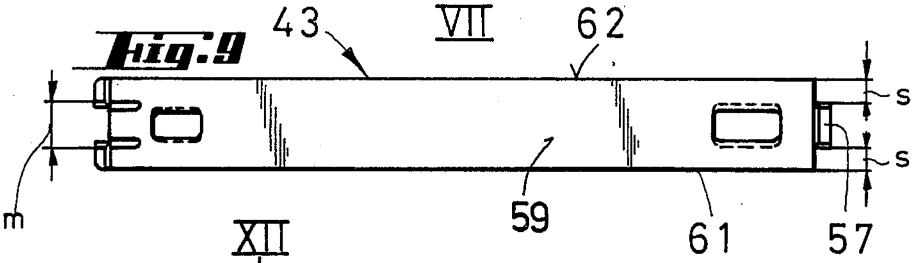
Fig. 10
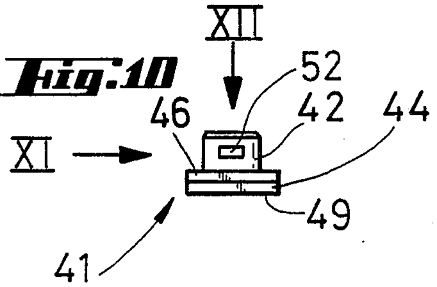
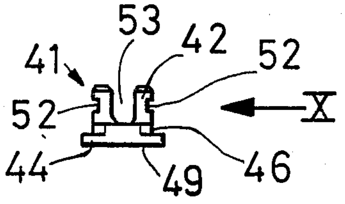
Fig. 11
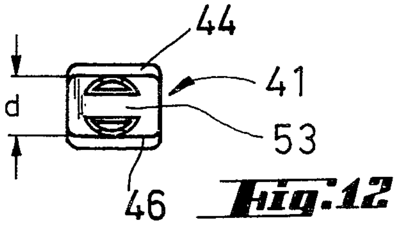
Fig. 12

PROCESS FOR PRODUCING SLATS FOR A VERTICAL SLATTED VENETIAN BLIND

The invention relates to a process for producing ready-to-use slats made from semifinished slat portions for a slatted Venetian blind with vertically directed slats. The term "semifinished slat portions" is understood to mean slats or slat portions, which are in the finished form at their upper ends, i.e. are bordered or the like and provided with a suspension means for suspending in a bearing rail, whilst having an extra length, so that at their lower end they are not yet provided with a border or the like for forming a conventional pocket for receiving a weight.

Venetian blinds with vertically directed slats used as sunshading means, room or space dividers or for decorative purposes and which are generally called vertical Venetian blinds for short and whose slats are generally made from textile or plastic materials are normally dimensioned by house designers, decorators, etc. as a function of the circumstances of a particular installation, whilst taking account of the height and width and are then supplied complete to the user or are installed on his premises. Thus, the length of the bearing rail is made to coincide with the width of a surface to be covered by such a Venetian blind. In addition, the individual slats are adapted to the particular installation height and in general between the lower end of the slats and the floor or a window-sill a gap of about 3 cm is left in the finished state.

This heightwise adaptation of the slats of a vertical Venetian blind does not merely mean cutting the slat portions to the height of the installation and instead at the lower end of the slat portions and whilst forming a pocket for a weight for weighting the slats a portion is wrapped round which must be taken into consideration before cutting takes place and whilst forming a pocket-like space. At the free end it is so joined to the slat portion by sewing, adhesion or the like that a weight can be laterally inserted into the thus formed pocket. Finally the weights of the individual slats introduced into said pockets are joined with a spacing means in the manner of a chain or the like.

This work, i.e. in particular the formation of the border cannot normally be carried out by amateurs, thereby increasing the initial costs for vertical Venetian blinds through having to employ trained personnel.

However, in numerous cases particularly inexpensive Venetian blinds are wished for, i.e. blinds which can be installed by amateurs so as to adapt without difficulty to the particular circumstances using finished and semifinished parts supplied by the manufacturer or a retailer.

In this connection it is already known from DOS 27 33 175 to provide at the lower end of the cut-to-length slat portions a U-shaped folded separate portion, whose narrow free edge portions are applied to the bottom of the cut-to-length slat portions being secured there at both longitudinal sides by means of a clip. Thus, amateurs are able to fit a pocket-like "border" at the lower end of the slats or slat portions which can then be provided with a weight.

However, this known construction is disadvantageous in that during use and despite the clamping action exerted by the clips and the consequently produced frictional engagement there can be a relative displacement between the fitted separate slat portions and the main slat portions. This clearly leads to an esthetically unsatisfactory, non-uniform lower termination of the Venetian blind and the spacers can even be stressed until they fracture. Therefore, this known construction must be rejected as unsatisfactory.

The problem of the present invention is to provide a process for producing ready-to-use slats formed from semifinished slat portions, together with suitable retaining or holding means for the same making it possible to produce ready-to-use vertical Venetian blinds, whilst obviating the aforementioned disadvantages. In addition it must be possible to amateurs to make them in a simple but accurate manner, without the correctly fitted state existing on installing the blind being lost after a period of time.

From the process standpoint this problem is solved by the present invention in that the over-long slat portions in the semifinished state are in each case cut at their free lower end to a predetermined length corresponding to the installation height, plus an extra amount taking account of the wrap-over portion, that in each case the wrap-over portion of a slat is wrapped at a length predetermined by the bending edge, that in each case the lower end portion of a slat is provided in the vicinity of a wrap-over portion with a perforation system consisting of at least two holes for receiving the retaining pins of retaining means, and that the retaining pins are passed through the holes and subsequently locked.

For avoiding measuring errors the wrapping of the wrap-over portion preferably takes place by means of a template or pattern, having a first template portion corresponding to the length of the wrap-over portion and which is bounded by two parallel edges, the lower edge of the cut-to-length slat portion being placed on the upper edge of the template during wrapping and the lower part of the slat portion is bent at the lower edge of the first template portion for forming the wrap-over portion.

The perforation or punching of the slat portions also preferably takes place by means of a template and according to a preferred development of the invention this is the same template used for wrapping the wrap-over portion, the first template portion, whose width is the same or slightly less than the width of the slat, being in each case laterally followed at a predetermined bending edge by a second and/or third template portion, provided in each case with a predetermined marking for the perforation to be formed.

This marking is preferably not a hole indicated on the second and third template portion and is for example punched out with a punch, hollow punch, or the like, because users do not generally have such tools. Instead the markings on the second and third template portions are preferably in the form of a marking line for positioning the indicating tongue of a commercially available office punch. The second and third template portions are in each case bent over and applied at the bending line thereof to the first template portion or the slat portion and after wrapping over and application and insertion into the holes, accompanied by the positioning of the tongue on the particular marking line the perforating or punching operation is performed.

For perforating the slat portion (including the wrap-over portion) the second template portion is preferably wrapped over on one slat side and the third template portion on the other side of the slat portion. Whilst taking account of the correspondingly provided marking line the punch is moved laterally up to the longitudinal edge of the slat portion and the two perforations are made successively. It is pointed out that only one hole of the perforation system secures the flat portion, because the wrap-over portions are conventionally much shorter than the distance between the holes of an office punch.

That part of the problem relating to the retaining means is solved according to the invention in that the retaining pins to be passed through the holes have a substantially cylindrical pass-through portion, whose diameter is at the most the same and preferably slightly smaller than the hole and which is to be locked by means of a locking means and that the pass-through portion of the retaining pin is terminated on one side by an enlarged head which prevents the retaining pin from slipping through the particular hole.

According to a preferred embodiment of the invention the locking means comprises a pair of locking strips which, for manufacturing and storage reasons are preferably identical and whose length substantially corresponds to the width of a slat or slat portion and in each case having on the narrow face thereof a stop member projecting substantially at right angles to the contact surface thereof and which in the fitted state engages over the particular edge of the slat or slat portion. The stop member of one strip of a pair of locking strips forming the locking means is to be connected in positively engaged manner with the stop member of the other strip. A passage hole for receiving a retaining means is provided at a distance from each stop member.

The passage holes are preferably in the form of slots for compensating minor tolerances in the distance between the holes. The slots extend in the longitudinal direction of the locking strips and consequently at right angles to the longitudinal direction of the slats.

The head of a retaining pin preferably has a guidance portion which is to be held in positively engaged manner in a passage hole of a locking strip in such a way that although the retaining pin is displaceable for the aforementioned reasons in the longitudinal direction of the passage hole, but does not have to be held in a rotatably guided manner, and that at the free end of the passage portion of the retaining pin a notch is provided which in the fitted state is connected in positively engaged manner with the longitudinal edges of a passage hole of the locking strip facing the head. The rotation-fixed construction and arrangement of the retaining pins is particularly advantageous for ensuring that they automatically assume the predetermined fitting position and are secured therein, so as to ensure in this way the positively engaging locking thereof.

A flange is preferably provided at the free longitudinal edges of at least one passage hole of the locking strips and cooperates in positively engaged manner either with the head of a retaining pin (as a contact surface or abutment) or with a notch of a retaining pin (also as a locking means).

The retaining pins are preferably longitudinally slotted, so that the two tongues of the pass-through portion which are thereby formed are radially elastic and after prior compression by the corresponding edges of a passage hole in the mounted state can spring back to the normal state and engage due to their elastic restoring forces.

The two aforementioned stop members of each preferably identically constructed locking strip are appropriately differently constructed. Preferably one stop member of each locking strip is centrally arranged at one front face and terminates on both sides with a spacing with respect to the longitudinal edges. The other or second stop member comprises two parts beginning at the longitudinal edges and which are so long that a free portion is left between them, whose length corresponds to that of the first stop member in order that in the fitted state a first stop member of a first locking strip can cooperate with a second stop member of the second locking strip belonging to a pair of locking strips.

To ensure a suitable positive engagement according to a further development at the two faces of the first stop member a projecting attachment is in each case formed which fits into a corresponding recess of the second stop member.

The construction of the retaining means is such that in the locked state of the two locking strips of a pair of locking strips between their facing insides there is always a slot-like gap, whose thickness substantially corresponds to double the thickness of a slat, so that the raised free edged part of the wrap-over portion and the facing part of the slat portion fit between the two locking strips in the fitted state.

It is also pointed out that the heads of the retaining pins in the fitted state are preferably at least substantially aligned with the outsides of the locking strips, so that in the completely installed state there is not only a technically completely satisfactory solution, but also the esthetic appearance obtained satisfies the requirements made thereon for a number of uses.

Preferred developments of the invention are described in the subclaims.

The invention is described in greater detail hereinafter relative to non-limitative embodiments and the attached drawings, wherein show:

FIG. 1—a somewhat simplified perspective view of a ready-to-use vertical Venetian blind.

Figure 2:
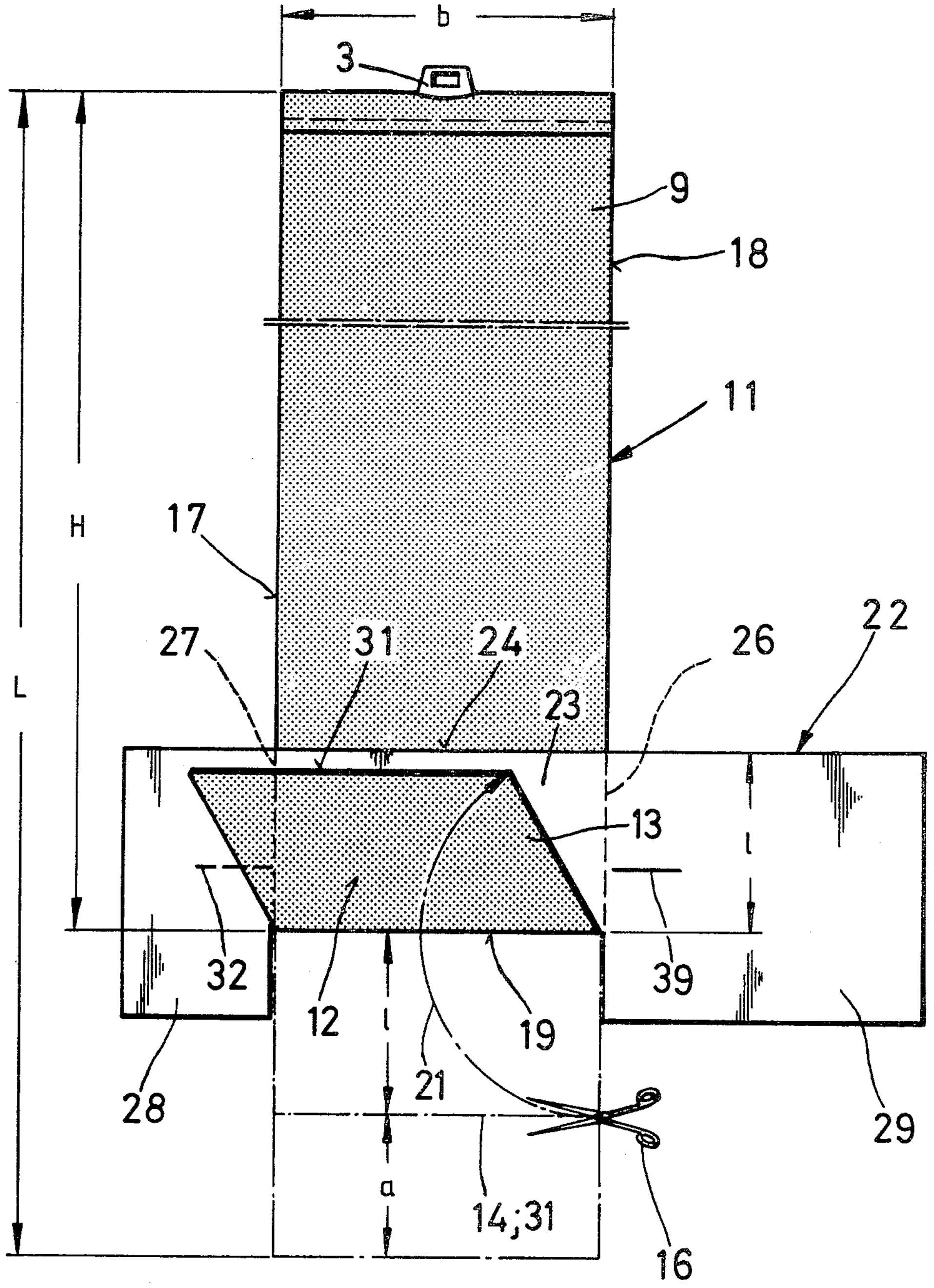

FIG. 2—a somewhat diagrammatic view of the wrapping of the wrap-over portion of a slat portion by means of a suitable template.

Figure 3:
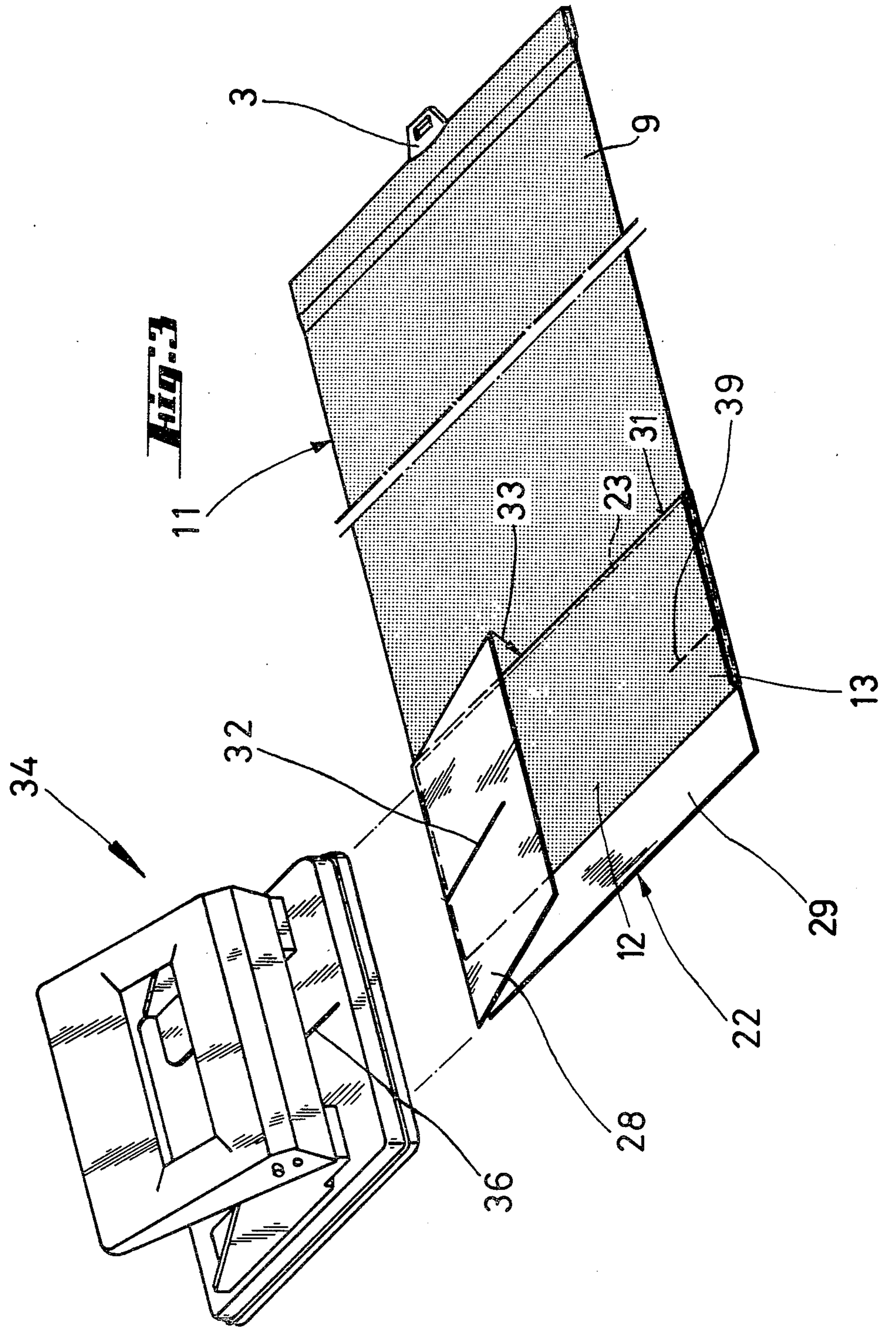

FIG. 3—a slat portion with a wrapped wrap-over portion and a template located in this area for making the holes using a conventional office punch.

Figure 4:
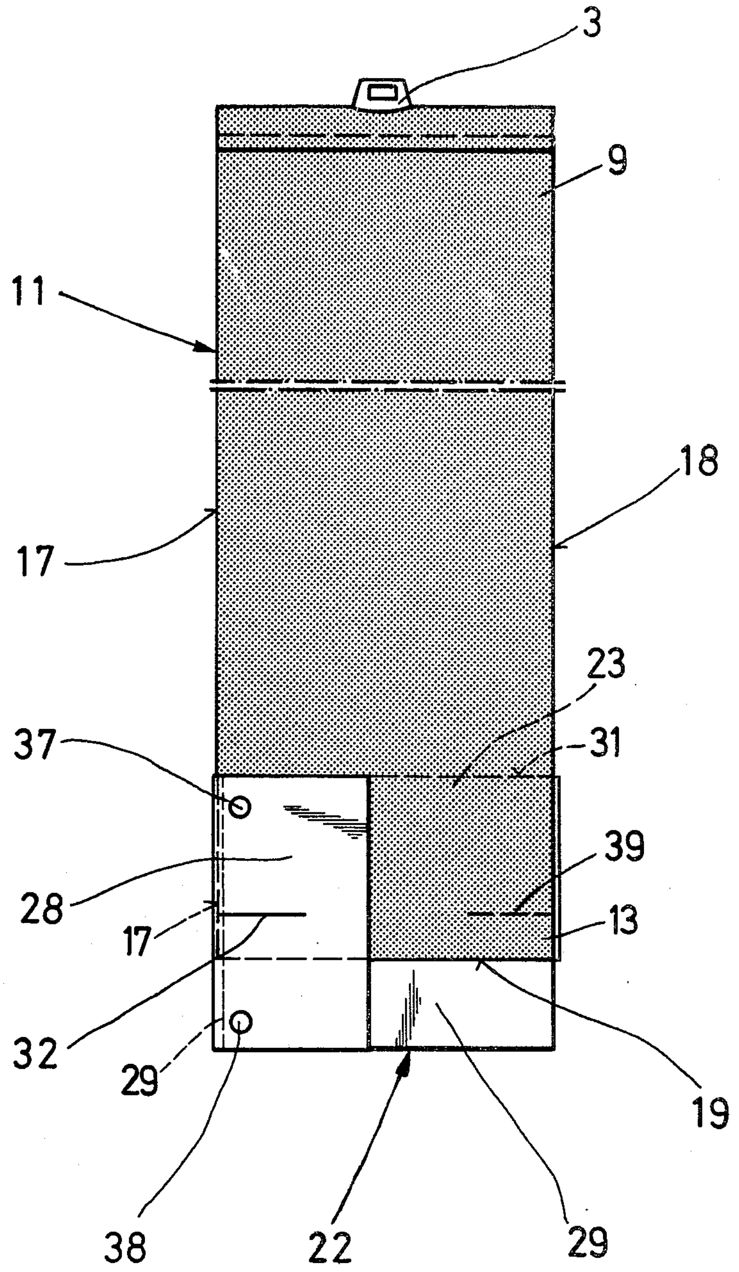

FIG. 4—a slat portion after making the first holes with an applied template.

Figure 5:
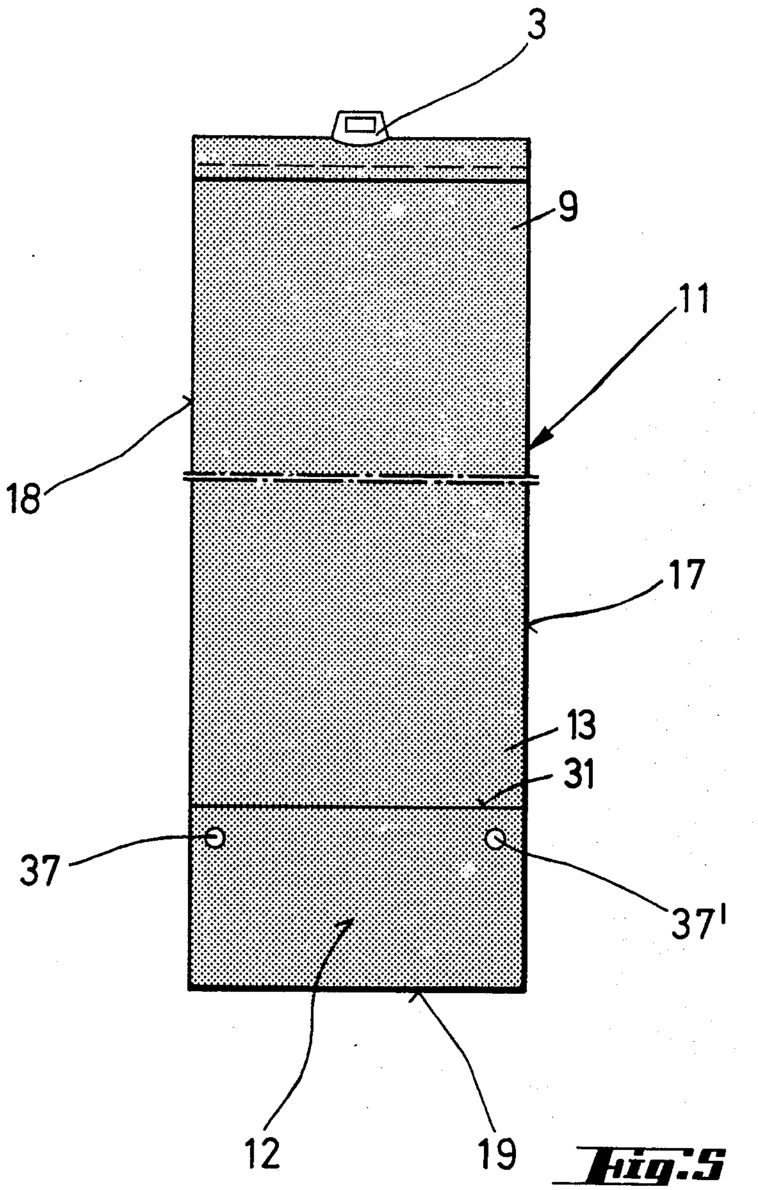

FIG. 5—the slat portion of FIG. 4 after making the holes and removing the template.

Figure 6:
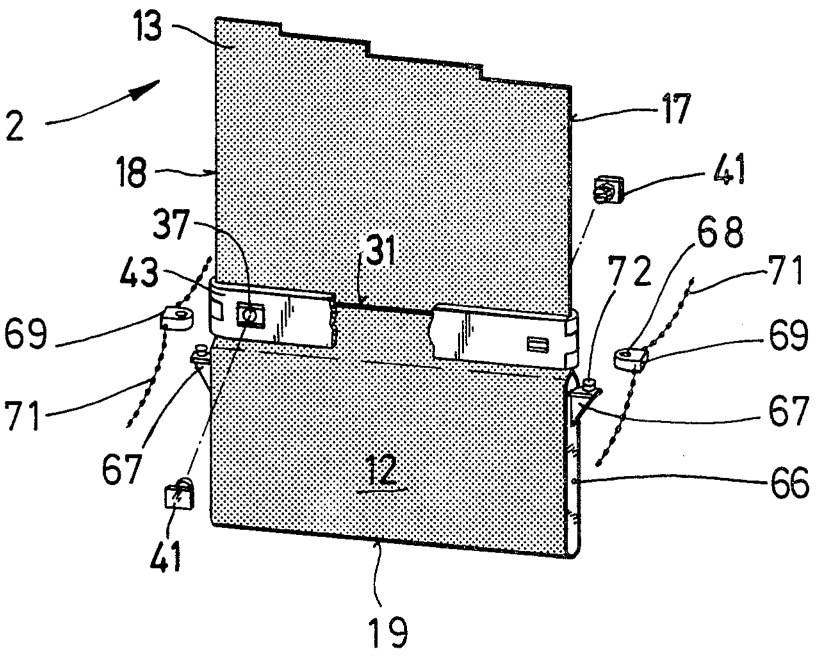

FIG. 6—the lower part of a partly cut, ready-for-use slat, partly as an exploded view.

FIG. 7—a view of a locking strip in the direction of arrow VII in FIG. 8.

FIG. 8—a plan view of the locking strip of FIG. 7 in the direction of arrow VIII thereof.

FIG. 9—a view of the inside of the locking strip facing the slat portion according to FIGS. 7 and 8 in the direction of arrow IX in the latter.

FIG. 10—a plan view of a retaining pin in the direction of arrow X in FIG. 11 on a larger scale compared with FIGS. 7 to 9.

FIG. 11—a view of the retaining pin according to FIG. 10 in the direction of arrow XI thereof.

FIG. 12—a plan view of the retaining pin of FIGS. 10 and 11 in the direction of arrow XII of the latter.

FIG. 1 shows a vertical Venetian blind in the ready-for-use state in which the vertically directed, individual slats 2 are in each case suspended by means of a ring 3 (cf. e.g. FIG. 2) on hook-like end portions of pivot pins 4 held in a bearing rail 6 by means of a travelling carriage not shown in the drawings. Slats 2 are movable in the longitudinal direction of bearing rail 6 by means of a first driving mechanism 7 formed by a closed cord hanging downwards from the bearing rail, in order to be able to cover as a sun or light protecting means or leave free e.g. a window located behind Venetian blind 1 (cf. FIG. 1). In the represented embodiment slats 2 are also rotatable or pivotable about their pivot pins 4 by means of a second driving mechanism 8 formed by a closed chain.

Such Venetian blinds 1 are known per se and do not form part of the invention. The invention in fact relates to a process for producing ready-to-use slats 2, as shown in the finished state in FIG. 1, from over-long semifinished slat portions, whose lower end part is not initially provided with a border according to FIG. 1, weights and spacers, as well as components suitable for performing this process, as will be described in greater detail hereinafter.

The installation width B is determined by the window or the like to be covered. Thus, the person making the Venetian blind according to the present process, generally constituted by the consumer and therefore a non-expert, selects a corresponding rail from the available stock of the manufacturer and uses it without shortening it.

The installation height H, i.e. the finished height of Venetian blind 1 is also predetermined. However, the slat portions 11 at the upper end thereof (i.e. at 9) do not have the length corresponding to installation height H and instead have an extra length L (cf. FIG. 2), which is equal to H plus length l of a wrap-over portion 12, plus a part a to be cut off in accordance with the specific installation in the manner to be described hereinafter. Length l of wrap-over portion 12 in the represented embodiment is 70 mm and length a is dependent on the initial length L and the installation height H which is dependent on the particular circumstances.

Initially the slat portions 11 provided with an extra length L are marked at their lower end 13 facing the upper end 9 with a line of cut 14 and cut off with cutters 16 or the like at right angles to the longitudinal edges 17, 18 of the particular slat portion 11, so that the thus prepared slat portions 11 have an overall length (without taking account of ring 3) of H+1.

The wrap-over portion 12 is then wrapped over in accordance with arrow 21 at the bending edge 19 removed by length l from line of cut 14 and parallel thereto, i.e. is swung into the particular side of the slat portion 11.

This appropriately takes place by means of a pattern or template 22. Template 22 has a first template portion 23 corresponding to the length l of wrap-over portion 12, whose width is the same as the width b of slat portion 11 and which at its two other edges 26, 27 at right angles to the bending edge 19 and the fitting edge 24 parallel thereto and which are constructed as bending edges (e.g. by perforation) and which still have to be described or are correspondingly marked (e.g. by printing on a line) is connected with a second template portion 28 and a third template portion 29, whose construction and function will be explained hereinafter.

Thus, for producing ready-to-use slats initially the template 22 is moved from the lower edge 31 (corresponding to the line of cut 14) in the direction of upper end 9 for forming the wrap-over portion 12 on slat portion 11. The lower edge 31 of slat portion 11 is applied to the fitting edge 24 of the first template portion 23 and is bent at bending edge 19, so that to this extent the situation of FIGS. 3 to 5 is obtained.

The second template portion 28 which, in the position of template 22 shown in FIG. 2 is provided on its back with a marking line 32 is folded round the edge 27 on the now upwardly located side of the wrapped wrap-over portion 12 (i.e. in the direction of arrow 33 in FIG. 3), so that the marking line 32 is now visible. The third template portion 29 is now wrapped round edge 26 on the other side of slat portion 11 and is folded on to the latter, giving the position shown in FIG. 3.

In this position for perforating or punching the particular slat portion 11 a conventional office punch 34 is so positioned at the lower end 13 of slat portion 11, that its centre-indicating marking tongue 36 is located over the mark 32 of the second template portion 28, i.e. the "packet" formed by the lower end 13 of slat portion 11 and template 22 is introduced in the manner shown in FIG. 3 into holes 34.

After operating punch 34 two holes 37, 38 have been punched, hole 37 passing through template 22, slat portion 11 and wrap-over portion 12, whilst hole 38 is located outside slat portion 11. The reason is that for applying the retaining means it is merely necessary to have two holes 37, 37' at the same height as bending edge 19, so that the holes 38 are unimportant for the actual slat 2 and are only significant from the manufacturing standpoint.

After the first set of holes (cf. FIG. 4) has been produced, the second set of holes is produced by turning slat portion 11 so that the third template portion 29 and consequently its marking line 38 are at the top, enabling perforations to be made in the same way on the other longitudinal edge of slat portion 11, as described hereinbefore with reference to FIGS. 3 and 4.

Following the second punching operation performed with the aid of template 22 producing hole 37' in slat portion 11, template 22 can be removed giving the state shown in FIG. 5. In this state wrap-over portion 12 must be fixed in the manner indicated in FIG. 5 in order to finally arrive at the ready-to-use state, as shown in simplified form in FIG. 1 and in the perspective, part sectional view of FIG. 6, which is partly in exploded form.

For this purpose two retaining pins 41 are placed through the two holes 37, 37' (FIG. 5) and are shown in FIGS. 10 to 12 in a scale of approximately 2:1. Thus, with respect to the outer contour thereof the retaining pins 41 have a substantially cylindrical pass-through portion 42, whose diameter d defined by the partly interrupted outer contour is the same as the diameter of holes 37, 37'. Retaining pins 41 are locked in the final state by means of locking means constituted by a pair of locking strips 43.

For this purpose the retaining pins 41 have a rectangular head 44 which is larger than the pass-through portion 42, and in the fitted state prevents the pin from slipping through the holes 37, 37'. Head 44 of each retaining pin 41 has a guidance portion in the form of a shoulder 46 to be held in positively engaged manner in the passage hole 47 of a locking strip 43 in such a way that the retaining pin 41 can be moved in the longitudinal direction of the slot-like passage hole 47, but is not rotatably guided. To this end passage hole 47 of locking strip 43 contains a pair of facing flanges 48, which cooperate in positively engaged manner with the shoulder 46 of retaining pin 41 in such a way that the outside 49 of head 44 is aligned with the particular outside 51 of the locking strip 43.

On the free end part of the pass-through portion 42 of retaining pin 41 remote from head 44 a notch 52 in the form of a slot-like cut is provided on either side (cf. FIGS. 10 and 11), which in the fitted state cooperates in positively engaging manner with the flange 48 of the facing passage hole 47 of the locking strip facing the head.

In addition, the retaining pins 41 are centrally provided with a slot 53 extending down to head 44, i.e. over the length of the pass-through portion 42 thereof, so that the two facing parts of pass-through portion 42 also form elastic resilient tongues, which are elastically deformable radially to one another.

Locking strips 43, shown in detailed manner in FIGS. 7 to 9 are made, like retaining pin 41, from a plastics material. In each case two identical locking strips 43 form the locking means for retaining pins 41 and consequently wrap-over portion 12 and the weight inserted into it.

On each of the two front faces 55, 56 is provided a stop member 57, 58 at right angles to the inward contact surface 59 of locking strips 43 and which in the fitted state engage over the longitudinal edges 17, 18 of slat portion 11.

The stop member 57 provided on the face 55 of each locking strip 43 is positioned centrally and terminates at a distance s from the two longitudinal sides 61, 62 of locking strip 43.

The two-part stop member 58 on face 56 starts at longitudinal edges 61, 62 and ends at a distance from the centre. A free portion is left, whose length m is the same as the length of the other stop member 57.

An offset projecting attachment 63 is provided on the two faces of stop member 57 facing longitudinal side 61, 62, whilst forming a type of shoulder and in each case fits into a corresponding recess 64 of stop member 58. The two recesses 64 with the remaining parts of stop member 58 also form a counter-shoulder.

The operations following the state according to FIG. 5 using the retaining means according to FIGS. 7 to 12 (cf. also claim 6) are as follows:

A locking strip 43 with its contact surface 59 is applied on either side of slat portion 11 in the vicinity of holes 37, 37' in such a way that passage hole 57 is aligned with one of the two holes 37 or 37', whilst the second passage hole 65 is aligned with the other hole 37' or 37. It also takes place in such a way that the two locking strips 43 forming a pair face one another in such a way that a stop member 58 of one locking strip 43 faces the stop member 57 of the other locking strip 43 and vice versa.

The retaining pins 41 are then passed through the passage holes 47 and 65 of locking strips 43, as well as holes 37, 37' in such a way that pass-through portion 42 is always moved from the outside through hole 47 and head 44 of retaining pin 41 can cooperate with the particular flange 48 by means of its shoulder 46. This means that a first retaining pin 41 is introduced from one side of slat portion 11 and the other retaining pin 41 is introduced from the other side. Whilst adapting to holes 37, 37' the retaining pins are moved in the longitudinal direction of locking strip 43, whilst being guided by shoulder 46 and flange 48. However, the pins are unable to turn. This ensures that the notches 52 on the pass-through portion 42 are positioned at the top and bottom, i.e. parallel to longitudinal edges 61, 62 and therefore the longitudinal edges of passage hole 65 of the facing locking strip 43.

If the two locking strips 43 are compressed at their front ends engagement takes place of the two stop members 57, 58, the attachment 63 of stop member 57 being located in the recesses 64 of stop member 58, as shown in a somewhat simplified form in FIG. 6. If pressure is exerted on the retaining pins 41 in the manner indicated in FIG. 6, the notches 52 lockingly coöperate with the flange webs 48 provided on the longitudinal edges of the particular passage hole 65 and are in this way locked. Thus, the outside 49 of heads 44 is aligned with the outside 41 of the particular locking strip 43.

A weight 66 is then introduced from the side into the pocket formed by wrap-over portion 12 at the lower end of the slat portion. On their two front faces weights 66 are provided with receptacles 67 for the flaps 69 of the spacer having in each case a bore 68. They are fixed to a chain 71 with a spacing corresponding to that of slats 2 and can in each case be mounted with bore 68 on pins 72 of receptacle 67, so that finally the ready-for-use state of the vertical Venetian blind shown in simplified form in FIG. 1 is obtained.

What is claimed is:

1. Method of producing ready-to-use slats from semi-finished slat portions for use in a slatted Venetian blind having vertically directed slats, the semifinished slat portions being overlong, comprising the steps of cutting the free lower end of each semifinished slat to a predetermined length corresponding to the installation height plus an extra length equal to a wrap-over portion, folding the wrap-over portion at a bending edge, forming in the lower end portion of the slat in the vicinity of the wrap-over portion at least two holes, positioning retaining pins in said holes and subsequently locking said pins.

2. Method according to claim 1, wherein to avoid measuring errors the folding of the wrap-over portion is accomplished using a template or pattern, the template having a first template portion corresponding to the length of the wrap-over portion and the template being bounded by two parallel edges, and further including the steps of placing the lower edge of the cut-to-length slat portion on the upper edge of the template during folding, and bending the lower part of the slat portion at the lower edge of the first template portion for forming the wrap-over portion.

3. Method according to claim 2, and further including the steps of forming said holes in the slat portion utilizing said template, the first template portion having a width that is substantially the same as that of the slat, said first template portion laterally adjoining at predetermined bending lines a second and a third template portion, the second and third template portions being provided with predetermined marks for locating the holes to be formed.

4. Method according to claim 3, wherein the marks of the second and third template portions in each case are constituted by a marking line for locating a centering line of a commercially available punch, and further including the steps of folding the second and third template portions over at bending lines and applying them to the first template portion and slat portion, and after wrapping over and inserting the lower slat portion, the formation of the holes takes place with the aid of the markings.

5. Method according to claim 4, and further including the step wherein for forming the holes in the slat portion, the second template portion is wrapped over on one slat side and the third template portion is wrapped over on the other side of the slat portion.

* * * * *